(12) United States Patent
Lee et al.

(10) Patent No.: US 12,485,970 B2
(45) Date of Patent: Dec. 2, 2025

(54) PANEL ASSEMBLY FOR MOBILITY VEHICLE

(71) Applicants: Hyundai Motor Company, Seoul (KR); Kia Corporation, Seoul (KR)

(72) Inventors: Kang Chul Lee, Seoul (KR); Sun Hyung Cho, Suwon-Si (KR); Ju Chul Kim, Ulsan (KR); Do Hoi Kim, Sejong-Si (KR)

(73) Assignees: Hyundai Motor Compnay, Seoul (KR); Kia Corporation, Seoul (KR)

( * ) Notice: Subject to any disclaimer, the term of this patent is extended or adjusted under 35 U.S.C. 154(b) by 376 days.

(21) Appl. No.: 18/134,446

(22) Filed: Apr. 13, 2023

(65) Prior Publication Data
US 2024/0166263 A1     May 23, 2024

(30) Foreign Application Priority Data
Nov. 22, 2022   (KR) ........................ 10-2022-0157341

(51) Int. Cl.
*B62D 25/02*     (2006.01)

(52) U.S. Cl.
CPC .................................... *B62D 25/02* (2013.01)

(58) Field of Classification Search
CPC ........ B62D 25/00; B62D 25/02; B62D 25/04; B62D 25/08; B62D 27/02; B62D 27/023; B62D 27/026
USPC .................. 296/191, 29, 193.04, 5, 203.01–4
See application file for complete search history.

(56) References Cited

U.S. PATENT DOCUMENTS

2007/0262128 A1* 11/2007 Durney .................. B62D 25/14
                                            229/132

FOREIGN PATENT DOCUMENTS

| JP | 2015131528 A | * | 7/2015 | |
|---|---|---|---|---|
| KR | 19980039513 U | * | 9/1998 | ............. B62D 25/02 |
| KR | 10-2016-0003186 | | 1/2016 | |
| WO | WO-2015137379 A1 | * | 9/2015 | ........... B62D 25/025 |

OTHER PUBLICATIONS

JP2015131528 Text (Year: 2015).*
KR19980039513 Text (Year: 1998).*
WO2015137379 Text (Year: 2015).*

* cited by examiner

*Primary Examiner* — Dennis H Pedder
(74) *Attorney, Agent, or Firm* — Morgan Lewis & Bockius LLP

(57) ABSTRACT

A panel assembly for a mobility vehicle is introduced, in which when the external plate is joined to the vehicle body frame, a bent portion is accommodated on and joined to the vehicle body frame, and a fixed state is maintained by a fastening method or a fitting method when the external plate is joined to the vehicle body frame so that a robust fixed state is maintained. Even though the specifications of a vehicle body frame are changed, some of a plurality of parts, which forms an external plate, may be changed and applied to the changed vehicle body frame, which makes it possible to flexibly cope with the specifications of various mobility vehicles.

15 Claims, 11 Drawing Sheets

PANEL ASSEMBLY FOR MOBILITY VEHICLE

CROSS REFERENCE TO RELATED APPLICATION

The present application claims priority to Korean Patent Application No. 10-2022-0157341, filed on Nov. 22, 2022, the entire contents of which is incorporated herein for all purposes by this reference.

BACKGROUND OF THE PRESENT DISCLOSURE

Field of the Present Disclosure

The present disclosure relates to a panel assembly for a mobility vehicle, and more particularly, to a panel assembly for a mobility vehicle, which is capable of flexibly coping with specifications of various mobility vehicles and improving assembling properties of an external plate.

Description of Related Art

A general structure of a vehicle body is manufactured by machining and welding components through a pressing process using molds. For the present reason, there is a problem in that a massive amount of investment is required for facilities such as pressing factories, vehicle body welding factories, and painting factories and a design degree of freedom is low.

In the case of the vehicle body generally, a large number of changes in design are required to manufacture a small number of products of various types. For the present reason, there is a problem in that the number of molds is rapidly increased, which inevitably increases production costs. That is, an external plate of the vehicle body is shaped by applying a press die to a steel board, and the external plate is welded to a structure of the vehicle body. In the instant case, a pressing press having a high capacity is required to form the external plate, and a large amount of time is required to manufacture the die.

As described above, the method of manufacturing the external plate of the vehicle using the press process method as a mass-production method in the related art is not suitable for vehicles designed for the production of a small number of vehicles of various types. Furthermore, there is a demand for a solution capable of reflecting specifications that change to cope with the needs of customers and market environments that rapidly change.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a panel assembly for a mobility vehicle, which is configured for flexibly coping with specifications of various mobility vehicles and improving assembling properties of an external plate.

Various aspects of the present disclosure are directed to providing a panel assembly for a mobility vehicle, the panel assembly including: a vehicle body frame; and an external plate including a plurality of parts, in which each of the parts includes a bent portion that adjoins an external periphery of the vehicle body frame along the external periphery of the vehicle body frame, the parts are coupled to one another, and the bent portions of the parts are matched with the external periphery of the vehicle body frame so that the external plate is coupled to the vehicle body frame.

Each of the parts of the external plate may be made of a stainless material.

The external plate may include: a first portion disposed on a front part of the vehicle body frame; a second portion disposed at an upper side of a rear part of the vehicle body frame; and a third portion disposed at a lower side of the rear part of the vehicle body frame.

The first portion may be formed to be matched with an external peripheral shape of the front part of the vehicle body frame including a front pillar of the vehicle body frame, and a first bent portion may be provided at an upper end portion of the first portion and matched with an upper end portion of the external periphery of the vehicle body frame and the front pillar of the vehicle body frame.

The first bent portion may be divided into a first parting portion matched with the front pillar, and a second parting portion matched with the upper end portion of the external periphery of the vehicle body frame.

The first portion may be joined and fixed to the upper end portion of the external periphery of the vehicle body frame and the front pillar of the vehicle body frame in a state in which the first parting portion and the second parting portion are joined.

The second portion may be formed to be matched with an external peripheral shape of the rear part of the vehicle body frame including a center pillar and a rear pillar of the vehicle body frame, and a second bent portion may be provided at an upper end portion of the second portion and matched with an external peripheral shape of an upper end portion of the vehicle body frame.

The second bent portion may be bent to be matched with upper and rear end portions of the rear part of the vehicle body frame.

The second bent portion may be formed by bending upper and rear end portions of the second portion inwardly, an end portion of the second bent portion at the rear end portion may be partially cut, and an end portion of the second bent portion at the upper end portion may be bent inward in a state in which the end portion of the second bent portion at the upper end portion is bent in the same direction as the end portion of the second bent portion at the rear end so that the end portions of the second bent portion at the upper and rear end portions are bent to overlap each other.

A gap may be formed between a roof frame and a side frame of the vehicle body frame, and the second bent portion may be formed to be curved so that an end portion of the second bent portion is inserted between the roof frame and the side frame in a state in which the second bent portion is accommodated on an upper end portion of the side frame.

The third portion may be formed so that a third bent portion at a front end portion thereof is located between the first portion and the vehicle body frame, a third bent portion at an upper end portion thereof is located between the second portion and the vehicle body frame, and a third bent portion at a rear end portion thereof is matched with a rear end portion of an external periphery of the rear part of the vehicle body frame.

A front end portion of the third bent portion at the front end portion of the third portion may be curved inward and overlap the first portion so that an external surface of the third portion and an external surface of the first portion are matched in a forward and rearward direction thereof.

An upper end portion of the third bent portion at the upper end portion of the third portion may be curved inward and overlap the second portion so that an external surface of the third portion and an external surface of the second portion are matched in an upward and downward direction thereof.

The third portion, the second portion, and the first portion of the external plate may be sequentially joined to the vehicle body frame.

A groove portion may be provided in the vehicle body frame, an insertion portion, which is fitted with the groove portion, may be provided on an internal surface of the part of the external plate, and the insertion portion may be inserted into the groove portion when the part is joined to the vehicle body frame so that a fixed state is maintained.

A fastening member may penetrate the vehicle body frame from inside to outside thereof, and the part of the external plate may be fixed to the vehicle body frame as the fastening member is fastened when the part is joined to the vehicle body frame.

A plurality of protruding portions having a predetermined pattern may be formed on a portion of the vehicle body frame that faces the external plate, and the external plate may be joined to the protruding portion while being in contact with the protruding portion.

According to the panel assembly for a mobility vehicle structured as described above, even though the specifications of the vehicle body frame are changed, some of the plurality of parts, which forms the external plate, may be changed and applied to the changed vehicle body frame, which makes it possible to flexibly cope with the specifications of various mobility vehicles.

Furthermore, when the external plate is joined to the vehicle body frame, the bent portion is accommodated on and joined to the vehicle body frame, and the fixed state is maintained by the fastening method or the fitting method when the external plate is joined to the vehicle body frame so that the robust fixed state is maintained.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
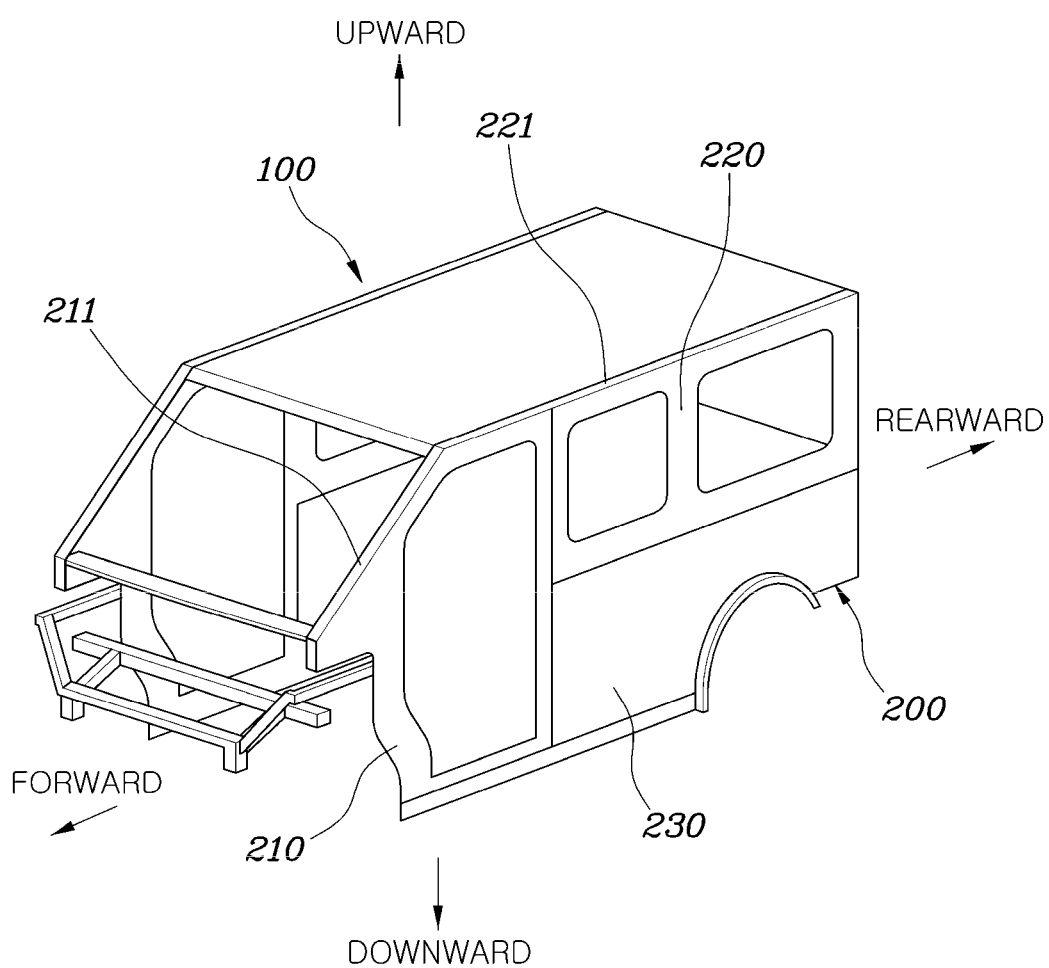
FIG. 1 is a view exemplarily illustrating a panel assembly for a mobility vehicle according to the exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments included in the present specification will be described in detail with reference to the accompanying drawings. The same or similar constituent elements are assigned with the same reference numerals regardless of reference numerals, and the repetitive description thereof will be omitted.

The suffixes "module", "unit", "part", and "portion" used to describe constituent elements in the following description are used together or interchangeably to facilitate the description, but the suffixes themselves do not have distinguishable meanings or functions.

In the description of the exemplary embodiments included in the present specification, the specific descriptions of publicly known related technologies will be omitted when it is determined that the specific descriptions may obscure the subject matter of the embodiments included in the present specification. Furthermore, it may be interpreted that the accompanying drawings are provided only to allow those skilled in the art to easily understand the exemplary embodiments included in the present specification, and the technical spirit included in the present specification is not limited by the accompanying drawings, and includes all alterations, equivalents, and alternatives that are included in the spirit and the technical scope of the present disclosure.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or directly connected to another constituent element, and an intervening constituent element can also be present between the constituent elements. When one constituent element is described as being "directly coupled to" or "directly connected to" another constituent element, it may be understood that no intervening constituent element is present between the constituent elements.

Singular expressions include plural expressions unless clearly described as different meanings in the context.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

Hereinafter, a panel assembly for a mobility vehicle according to various exemplary embodiments of the present disclosure will be described with reference to the accompanying drawings.

Figure 2:
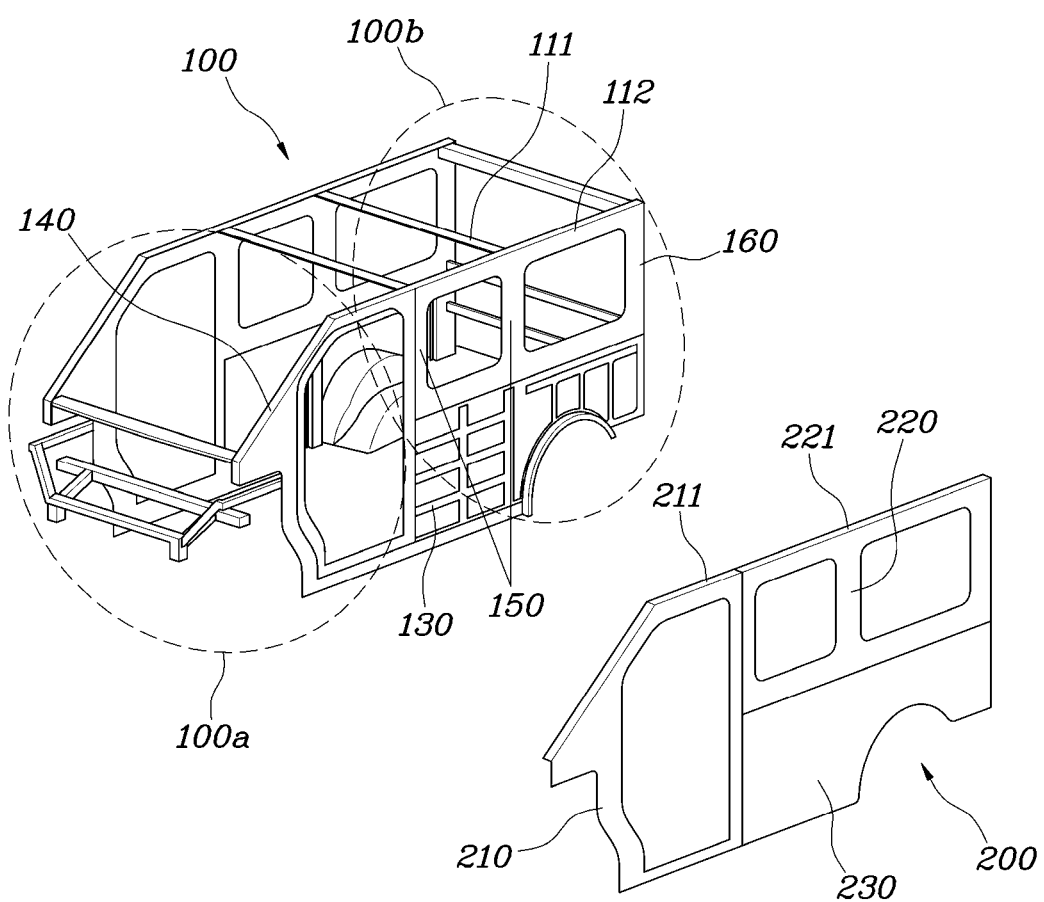
FIG. 2 is a view exemplarily illustrating a vehicle body frame and an external plate of the panel assembly for a mobility vehicle illustrated in FIG. 1.
Figure 3:
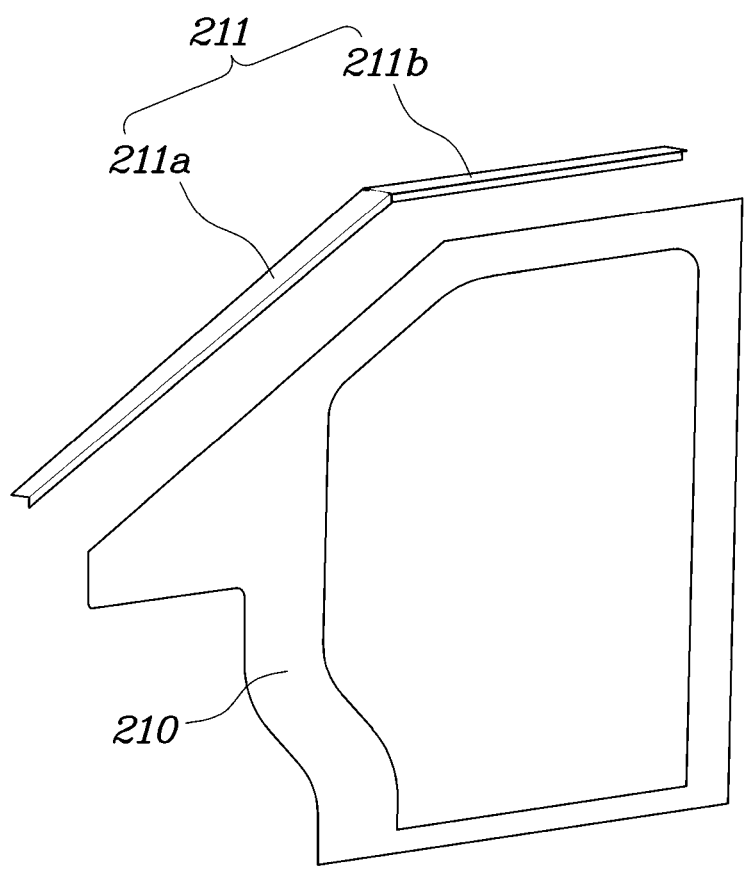
FIG. 3 is a view exemplarily illustrating a first portion of the external plate of the panel assembly for a mobility vehicle illustrated in FIG. 2.
Figure 4:
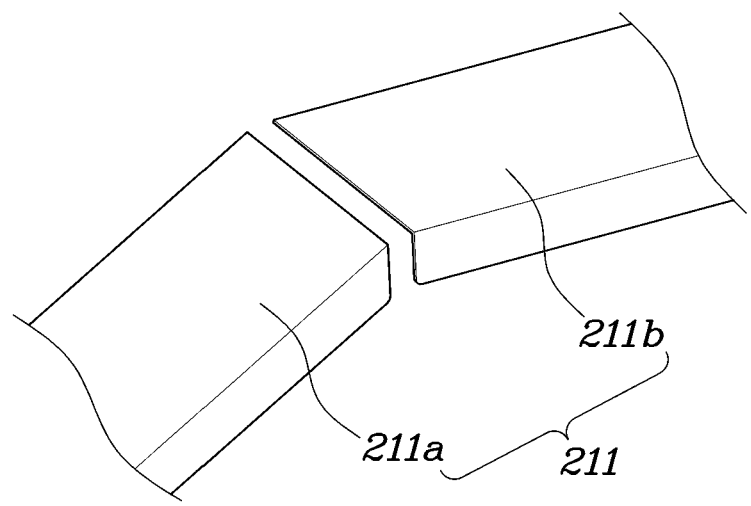
FIG. 4 is a view exemplarily illustrating a first bent portion of the first portion of the present disclosure.
Figure 5:
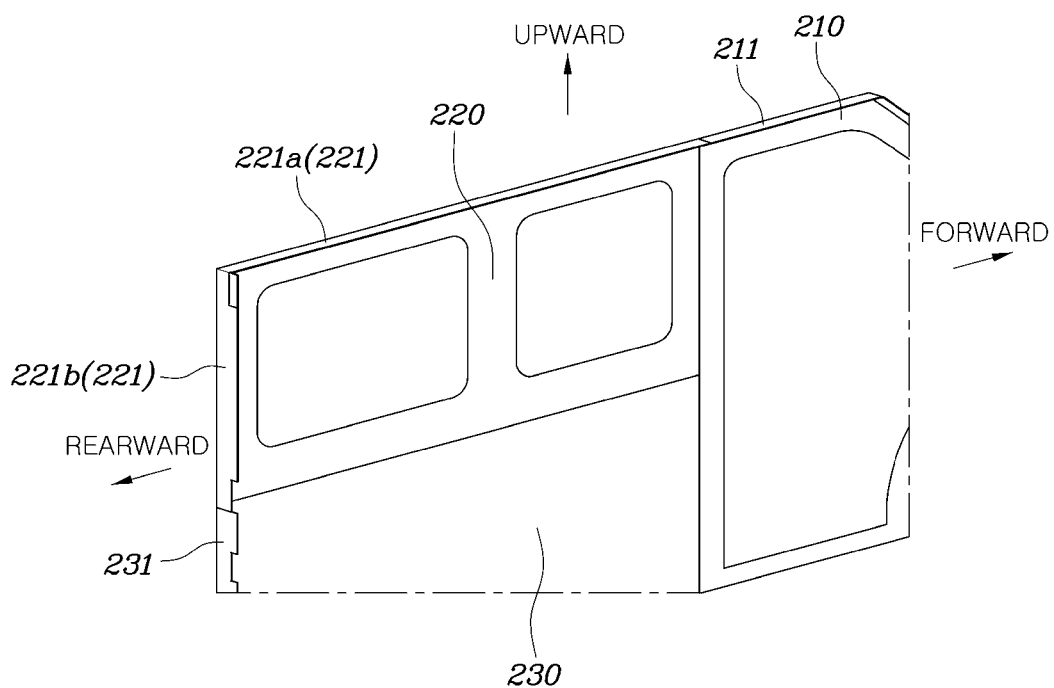
FIG. 5 is a view exemplarily illustrating second and third portions of the external plate of the panel assembly for a mobility vehicle illustrated in FIG. 2.
Figure 6:
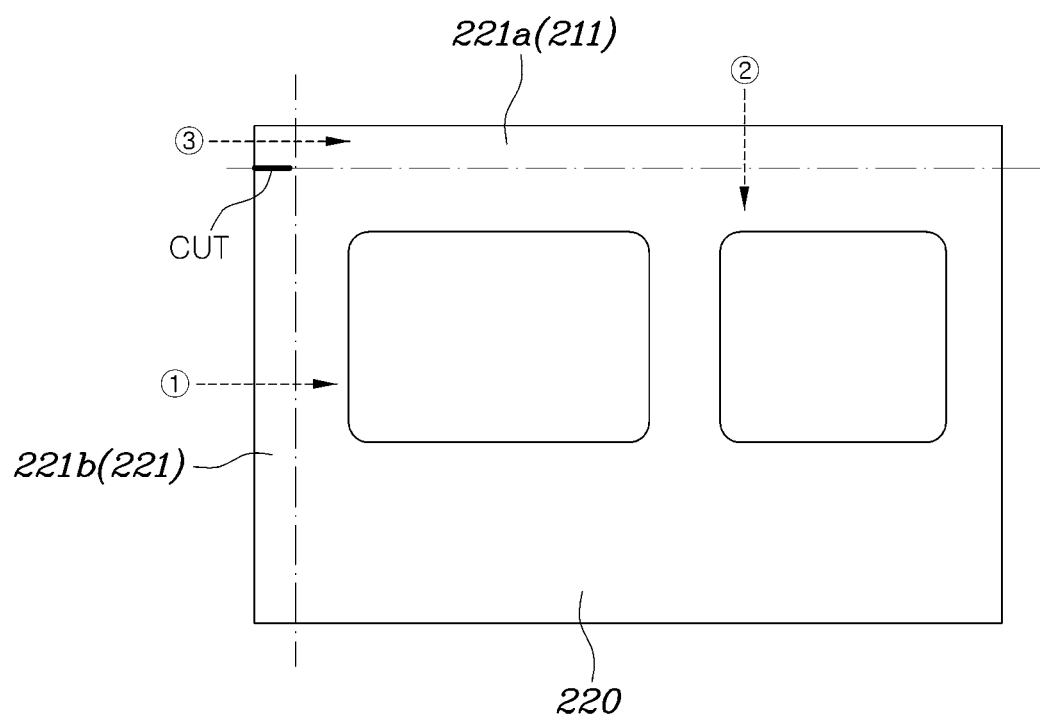
FIG. 6 is a view for explaining the second portion of the present disclosure.

FIG. 1 is a view exemplarily illustrating a panel assembly for a mobility vehicle according to the exemplary embodiment of the present disclosure, FIG. 2 is a view exemplarily illustrating a vehicle body frame and an external plate of the panel assembly for a mobility vehicle illustrated in FIG. 1, FIG. 3 is a view exemplarily illustrating a first portion of the external plate of the panel assembly for a mobility vehicle illustrated in FIG. 2, FIG. 4 is a view exemplarily illustrating a first bent portion of the first portion of the present disclosure, FIG. 5 is a view exemplarily illustrating second and third portions of the external plate of the panel assembly for a mobility vehicle illustrated in FIG. 2, and FIG. 6 is a view for explaining the second portion of the present disclosure.

Figure 7:
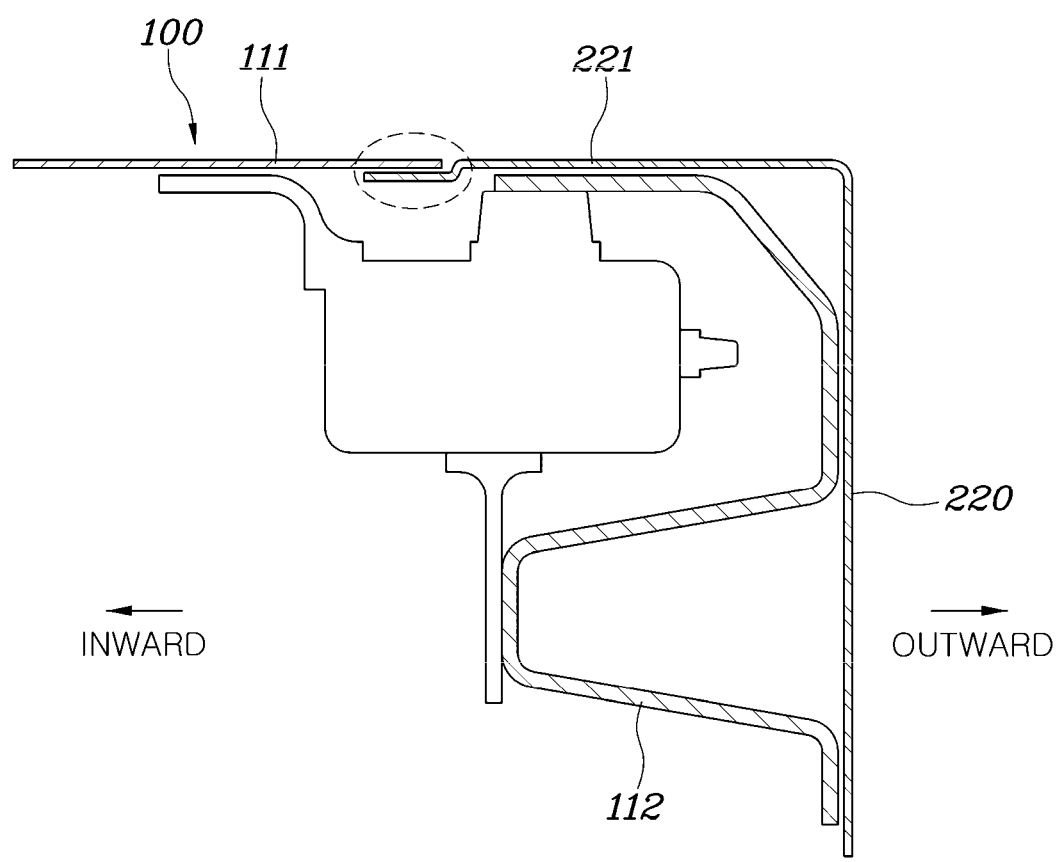
FIG. 7 is a cross-sectional view exemplarily illustrating that the vehicle body frame and the first portion of the panel assembly for a mobility vehicle illustrated in FIG. 2 are mounted.
Figure 8:
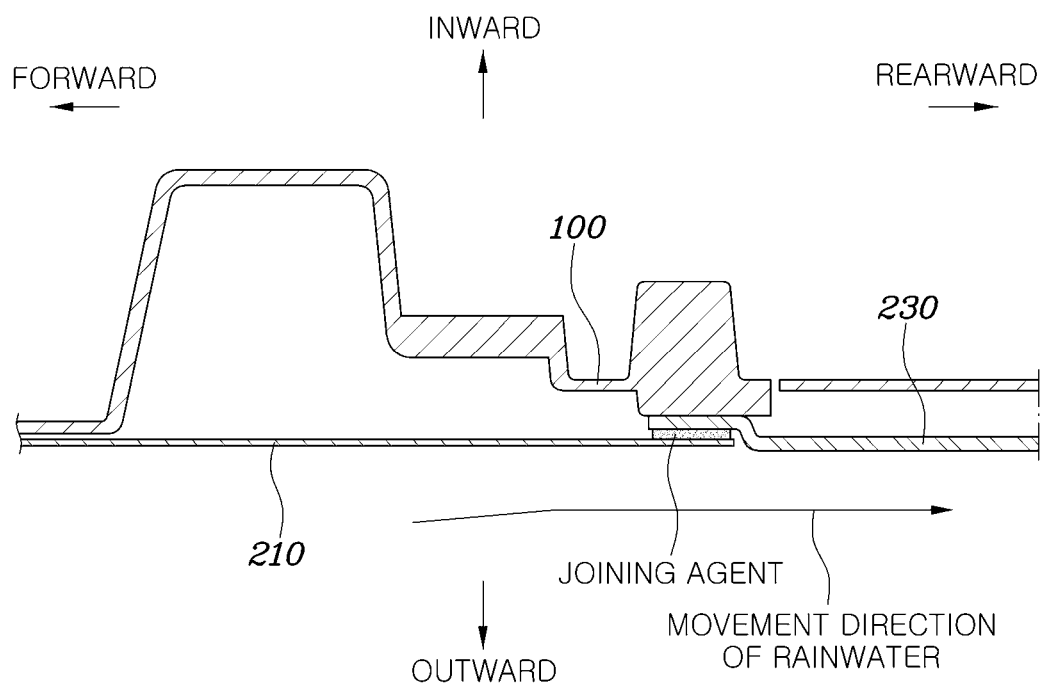
FIG. 8 is a cross-sectional view exemplarily illustrating that the vehicle body frame, the first portion, and the third portion of the panel assembly for a mobility vehicle illustrated in FIG. 2 are mounted.
Figure 9:
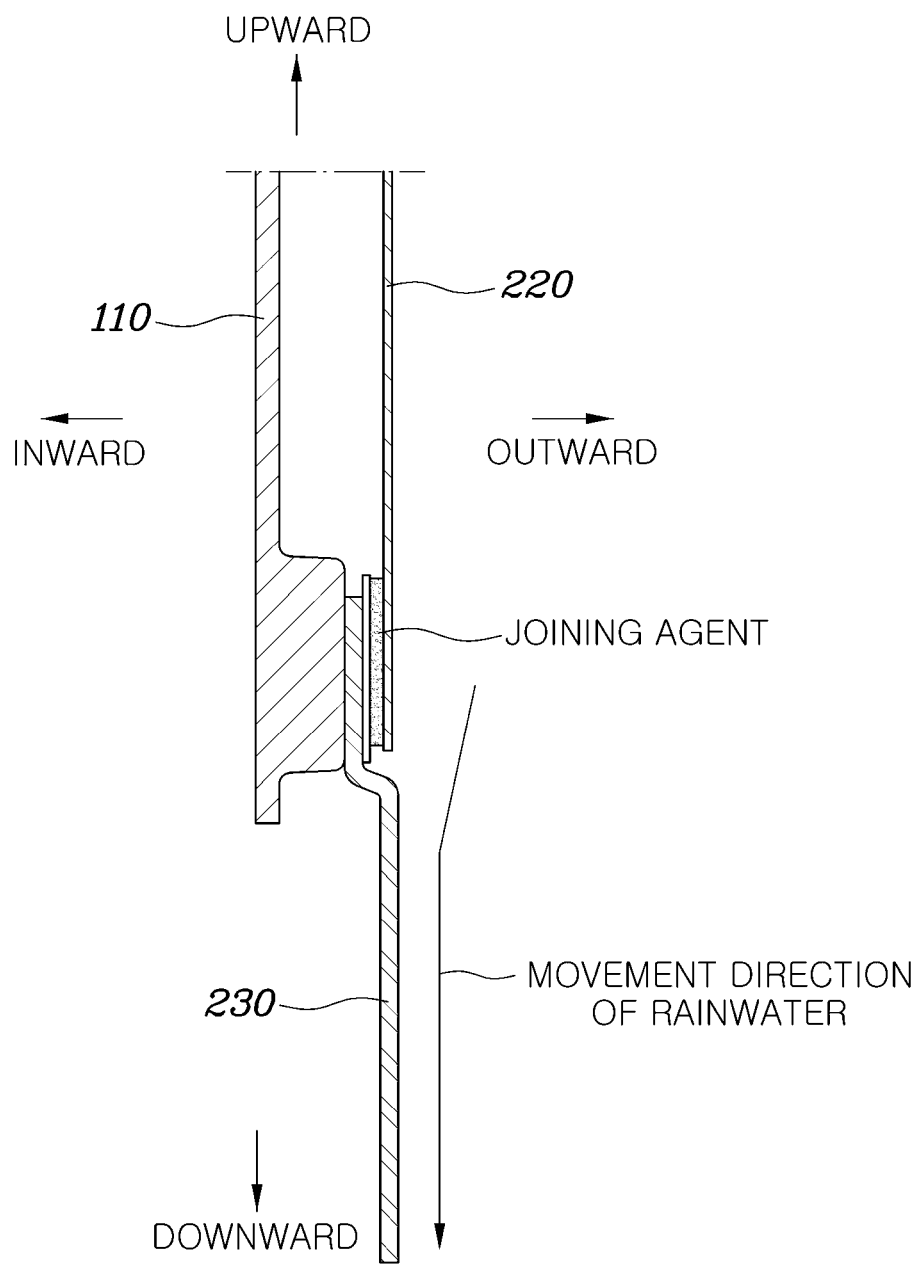
FIG. 9 is a cross-sectional view exemplarily illustrating that the second and third portions of the panel assembly for a mobility vehicle illustrated in FIG. 2 are mounted.
Figure 10:
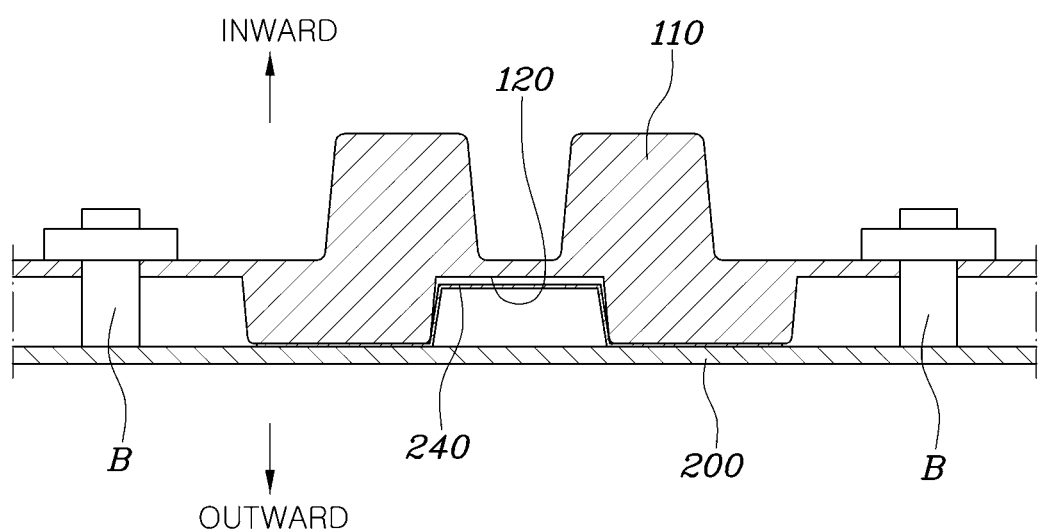
FIG. 10 is a view exemplarily illustrating an exemplary embodiment in which the vehicle body frame and the external plate of the panel assembly for a mobility vehicle illustrated in FIG. 2 are mounted.
Figure 11:
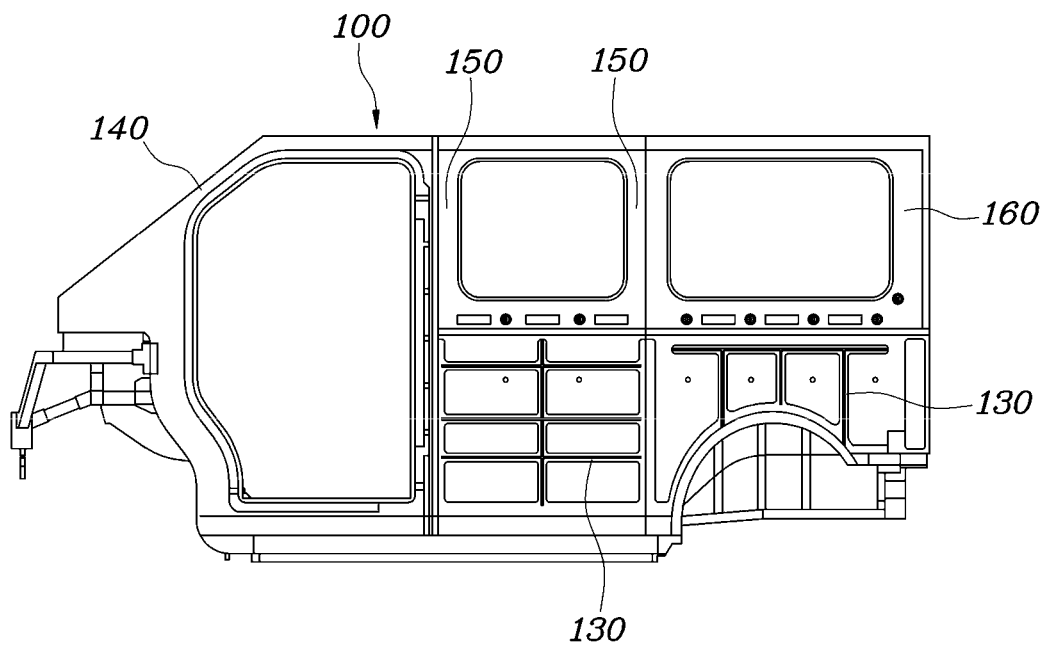
FIG. 11 is a view exemplarily illustrating protruding portions on the vehicle body frame of the present disclosure.

Furthermore, FIG. 7 is a cross-sectional view exemplarily illustrating that the vehicle body frame and the first portion of the panel assembly for a mobility vehicle illustrated in FIG. 2 are mounted, FIG. 8 is a cross-sectional view exemplarily illustrating that the vehicle body frame, the first portion, and the third portion of the panel assembly for a mobility vehicle illustrated in FIG. 2 are mounted, FIG. 9 is a cross-sectional view exemplarily illustrating that the second and third portions of the panel assembly for a mobility vehicle illustrated in FIG. 2 are mounted, FIG. 10 is a view exemplarily illustrating an exemplary embodiment in which the vehicle body frame and the external plate of the panel assembly for a mobility vehicle illustrated in FIG. 2 are mounted, and FIG. 11 is a view exemplarily illustrating protruding portions on the vehicle body frame of the present disclosure.

The mobility vehicle according to an exemplary embodiment of the present disclosure may be applied as a purpose-built vehicle (PBV). The PBVs may be variously used for various commercial purposes such as product distribution, food trucks, delivery, and service provision. A passenger may be accommodated in the mobility vehicle, and a structure may be changed in accordance with the passenger. Alternatively, only luggage may be loaded into an internal space of the mobility vehicle and transported without a passenger accommodated in the mobility vehicle. The PBV may be operated by an autonomous driving system.

However, generally, a process of manufacturing a mobility vehicle is performed for a comparatively long time period and a large amount of manufacturing cost is required to provide the mobility vehicle with a suspension for a vehicle, external components, internal components, a steering system, a safety device, and the like in consideration of convenience for passengers, ride quality for the passenger, safety specifications, external appearances, traveling performance, and the like. Furthermore, because separate vehicles suitable for various applications need to be manufactured, there is a problem in that it is impossible to manufacture customized vehicles suitable for all applications.

The mobility vehicle according to an exemplary embodiment of the present disclosure has a vehicle body including a structure which may be easily changed based on the purpose of use. The advantage of the mobility vehicle is that components of the mobility vehicle may be modularized and used in common so that costs may be reduced, a supply of components may be easily performed, and the mobility vehicle may be completely manufactured by mechanically coupling the modularized components of the vehicle through production processes in an environmentally friendly smart factory without a pressing process, a vehicle body welding process, and a painting process.

That is, the present disclosure is directed to simplify a manufacturing process at the time of joining an external plate 200 to a vehicle body frame 100 and eliminate a welding process as much as possible. Coupling strength needs to be ensured to join the external plate 200 to the vehicle body frame 100, and a reinforcement structure is required to maintain a robust joined state. Therefore, according to an exemplary embodiment of the present disclosure, the external plate 200 is divided into a plurality of parts, and joining strength is increased at the time of joining the respective parts to the vehicle body frame 100.

As illustrated in FIG. 1 and FIG. 2, the panel assembly for a mobility vehicle according to various exemplary embodiments of the present disclosure may include the vehicle body frame 100; and the external plates 200 divided into the plurality of parts, in which each of the parts includes a bent portion that adjoins an external periphery of the vehicle body frame 100 along the external periphery of the vehicle body frame 100, the parts are coupled to one another, and the bent portions of the parts are matched with the external periphery of the vehicle body frame 100 so that the external plates 200 are coupled to the vehicle body frame 100.

That is, in the case of a configuration in which the external plate 200 is joined to the vehicle body frame 100, the external plate 200 may be divided into the plurality of parts, and the respective parts may be joined to the vehicle body frame 100 by a joining agent. The plurality of parts, which forms the external plate 200, may be classified depending on the shape of the vehicle body frame 100.

The specifications of the mobility vehicle of the present disclosure may be changed depending on the purpose of use. Only some of the specifications of the mobility vehicle may be changed, while the remaining is not changed. Therefore, as the specifications of the external plate 200 in an exemplary embodiment of the present disclosure are changed, the external plate 200 may be divided into variable parts required to change in design, and fixed parts that do not change in design.

Therefore, the fixed parts are used in common for the external plate 200 for each mobility vehicle, and the variable parts are applied to portions of the mobility vehicle that change in shape, which makes it possible to flexibly cope with various specifications of the mobility vehicle and reduce manufacturing costs.

Meanwhile, the external plate 200 is joined to the vehicle body frame 100 by the joining agent. Each of the parts, which form the external plate 200, has the bent portion, so that each of the parts is positioned at a precise position on the vehicle body frame 100 and robustly joined.

The bent portion of each of the parts may be formed to adjoin the external periphery of the vehicle body frame 100 along an external peripheral shape of the vehicle body frame 100. The bent portion may be formed by folding a part of the end portion of each of the parts. Therefore, the bent portion of each of the parts of the external plate 200 may be formed by a process of bending the end portion of each of the parts. As another exemplary embodiment of the present disclosure, in a state in which the parts and the bent portions are manufactured, the parts and the bent portions may be joined to one another.

As described above, because the bent portion of each of the parts of the external plate 200 is accommodated on the vehicle body frame 100 and fixed in position, it is possible to prevent the position of the external plate 200 from being changed by the weight of the external plate 200 at the time of joining the part to the vehicle body frame 100 by the joining agent and to strongly join the external plate 200 and the vehicle body frame 100.

The present disclosure will be described specifically described. Each of the parts of the external plate 200 may be made of a stainless material. Therefore, the corrosion resistance and wear resistance of the external plate 200 of the mobility vehicle are ensured, and the convenience of assembling is improved because the external plate 200 and the vehicle body frame 100 are joined by the joining agent.

Meanwhile, according to the exemplary embodiment of the present disclosure, the external plate 200 may include a first portion 210 disposed on a front part 100a of the vehicle body frame 100, a second portion 220 disposed at an upper side of a rear part 100b of the vehicle body frame 100, and a third portion 230 disposed at a lower side of the rear part 100b of the vehicle body frame 100.

As described above, the external plate 200 is divided into three portions, i.e., the first portion 210, the second portion 220, and the third portion 230. In the instant case, the first portion 210 may be disposed on the front part 100a of the vehicle body frame 100, and the second and third portions 220 and 230 may be disposed on the rear part 100b of the vehicle body frame 100.

That is, when the specifications of the mobility vehicle are changed, the front part 100a of the vehicle body frame 100 may be modified, and an overall length or design of the vehicle body frame 100 may be changed in accordance with the purpose. Furthermore, only the interior of the rear part 100b of the vehicle body frame 100 may be modified, but the external peripheral design may not be changed.

Therefore, the first portion 210 of the external plate 200, which corresponds to the front part 100a of the mobility vehicle, is the variable portion and may be modified in design to correspond to the design of the front part 100a of the vehicle body frame 100. The second and third portions 220 and 230 are the fixed parts and may be manufactured to be suitable for the design of the rear part 100b of the vehicle body frame 100. However, because even the rear part 100b of the vehicle body frame 100 may be partially modified, the second and third portions 220 and 230 may be separately configured. Furthermore, because the rear part 100b of the vehicle body frame 100 is greater than the front part 100a of the vehicle body frame 100, the external plate 200, which is joined to the rear part 100b of the vehicle body frame 100, may be divided into the second and third portions 220 and 230 based on an upward and downward direction of the external plate 200.

As illustrated in FIG. 3 and FIG. 4, the first portion 210 may be formed to be matched with the external peripheral shape of the front part 100a of the vehicle body frame 100 including a front pillar 140 of the vehicle body frame 100. A first bent portion 211 may be provided at an upper end portion of the first portion 210 and matched with an upper end portion of an external periphery of the vehicle body frame 100 and the front pillar 140 of the vehicle body frame 100.

As described above, the first bent portion 211 is formed at the upper end portion of the first portion 210, and the first bent portion 211 is formed to be matched with the external peripheral shape of the front part 100a of the vehicle body frame 100.

In the instant case, the front pillar 140 of the front part 100a of the vehicle body frame 100, which corresponds to an A-pillar, may be changed in shape depending on the specifications of various mobility vehicles. Therefore, the first portion 210 is formed to be matched with the external peripheral shape of the front part 100a of the vehicle body frame 100. The first bent portion 211 extends to be matched with the upper end portion of the external periphery of the vehicle body frame 100 and the front pillar 140 of the vehicle body frame 100. Therefore, the first portion 210 of the external plate 200 is robustly joined to the vehicle body frame 100.

To the present end, the first bent portion 211 may be divided into a first parting portion 211a configured to be matched with the front pillar 140, and a second parting portion 211b configured to be matched with the upper end portion of the external periphery of the vehicle body frame 100.

The front pillar 140 of the vehicle body frame 100, which corresponds to the A-pillar, is a part which is variously changed depending on the specifications of the mobility vehicle. Furthermore, a length, an angle, and the like of the front pillar 140 of the vehicle body frame 100 may be variously set depending on the design of the mobility vehicle.

The first portion 210 has the first bent portion 211 formed to be matched with the front pillar 140 and the front part 100a of the vehicle body frame 100. In the instant case, in case that the first bent portion 211 is formed by bending the first portion 210, there is a problem in that portions of the first bent portion 211 overlap or interfere with one another at a point at which the first bent portion 211 is curved as the front pillar 140 of the front part 100a of the vehicle body frame 100 extends. Therefore, the first bent portion 211 is manufactured separately from the first portion 210 and divided into the first parting portion 211a and the second parting portion 211b. Furthermore, the first parting portion 211a is matched with the front pillar 140, and the second parting portion 211b is matched with the upper end portion of the external periphery of the front part 100a of the vehicle body frame 100. Therefore, at the time of forming the first bent portion 211 on the first portion 210, the first parting portion 211a and the second parting portion 211b may be joined to each other while being matched with the upper end portion of the front part 100a of the vehicle body frame 100 without interfering with each other.

Therefore, in the state in which the first parting portion 211a and the second parting portion 211b are joined to each other, the first portion 210 may be fixedly joined to the upper end portion of the external periphery of the vehicle body frame 100 and the front pillar 140 of the vehicle body frame 100. Furthermore, the first and second parting portions 211a and 211b, which form the first bent portion 211, may have end portions facing and adjoining each other. The first and second parting portions 211a and 211b are joined to the upper end portion of the first portion 210 in the state in which the first and second parting portions 211a and 211b are joined to each other by the joining agent.

Therefore, the first bent portion 211 of the first portion 210, which forms the external plate 200, is accommodated on the upper end portion of the external periphery of the front part 100a of the vehicle body frame 100 so that the position of the first portion 210 is not changed on the vehicle body frame 100 by the weight of the first portion 210. Furthermore, the joining position is maintained while the joining agent is cured in the state in which the joining agent is applied onto the first portion 210 and the vehicle body frame 100 and the first portion 210 and the vehicle body frame 100 are joined to each other, which makes it possible to ensure robust bondability.

Meanwhile, as illustrated in FIG. 5, the second portion 220 is formed to be matched with an external peripheral shape of the rear part 100b of the vehicle body frame 100 including a center pillar 150 and a rear pillar 160 of the vehicle body frame 100. A second bent portion 221 may be formed at an upper end portion of the second portion 220 and matched with the external peripheral shape of the upper end portion of the vehicle body frame 100.

As described above, the second bent portion 221 is formed at the upper end portion of the second portion 220, and the second bent portion 221 is formed to be matched with the external peripheral shape of the rear part 100b of the vehicle body frame 100.

In the exemplary embodiment of the present disclosure, the rear part 100b of the vehicle body frame 100 may have the center pillar 150 corresponding to a B-pillar and a C-pillar, and the rear pillar 160 corresponding to a D-pillar. In the instant case, the rear part 100b of the vehicle body frame 100 may be a region in which a design shape is not changed even though the specifications of the mobility vehicle are changed.

Therefore, the second portion 220 is formed to be matched with the external peripheral shape of the rear part 100b of the vehicle body frame 100. The second bent portion 221 extends to be matched with external peripheries of an upper end portion and a rear end portion of the rear part 100b of the vehicle body frame 100 including the center pillar 150 and the rear pillar 160. Therefore, the second portion 220 of the external plate 200 may be robustly joined to the vehicle body frame 100.

To the present end, the second bent portion 221 may be bent to be matched with the upper and rear end portions of the rear part 100b of the vehicle body frame 100.

That is, the second bent portion 221a provided at the upper end portion of the second portion 220, which forms the external plate 200, is accommodated on the upper end portion of the external periphery of the rear part 100b of the vehicle body frame 100 so that the position of the second portion 220 is not changed by the weight of the second portion 220. Furthermore, the second bent portion 221b provided at the rear end portion of the second portion 220 is matched with a rear end portion of an external periphery of the rear part 100b of the vehicle body frame 100 so that the second portion 220 may be positioned at a precise position on the vehicle body frame 100.

Therefore, when the second portion 220 is bonded to the vehicle body frame 100 by the joining agent, the position of the second portion 220 is maintained while the joining agent is cured in the state in which the second portion 220 is positioned at the precise position on the vehicle body frame 100. Therefore, the cured joining agent may ensure robust bondability.

Meanwhile, the second bent portion 221 is formed by bending the upper and rear end portions of the second portion 220 inwardly. An end portion of the second bent portion 221b at the rear end portion thereof is partially cut, and an end portion of the second bent portion 221a at the upper end portion thereof is bent inward in a state in which the end portion of the second bent portion 221a at the upper end portion thereof is bent in the same direction as the end portion of the second bent portion 221b at the rear end portion. Therefore, the end portions of the second bent portion 221b at the upper and rear end portions may be bent to overlap each other.

In an exemplary embodiment of the present disclosure, the second bent portion 221 is formed by bending the upper and rear end portions of the second portion 220 inwardly. In the instant case, a rear end portion of the second bent portion 221a at the upper end portion of the second portion 220 and an upper end portion of the second bent portion 221b at the rear end portion of the second portion 220 interfere with each other.

Therefore, as may be seen in FIG. 6, the end portion of the second bent portion 221b at the rear end portion of the second portion 220 is partially cut so that the remaining portion of the second bent portion 221b is bent inwardly, except for an upper side of the cut portion of the rear end portion of the second portion 220. In the instant case, the cut portion of the second bent portion 221b at the rear end portion thereof is bent together with the second bent portion 221a at the upper end portion when the second bent portion 221a at the upper end portion thereof is bent. Furthermore, the end portion of the second bent portion 221a at the upper end portion, which is the cut portion, is bent in the same direction as the second bent portion 221b at the rear end portion. Therefore, the second bent portion 221a at the upper end portion and the end portion of the second bent portion 221b at the rear end portion are bent to overlap each other.

Therefore, in the configuration in which the second portion 220 includes the second bent portion 221, the second bent portion 221a at the upper end portion and the second bent portion 221b at the rear end portion partially overlap each other. Therefore, even though the second bent portion 221 is configured by bending the second portion 220, the interference is prevented, and the overlapping portions minimize tolerance so that the marketability is improved and the ease of manufacturing is ensured.

Meanwhile, as illustrated in FIG. 7, a gap is formed between a roof frame 111 and a side frame 112 of the vehicle body frame 100, and the second bent portion 221 may be formed to be curved so that the end portion of the second bent portion 221 is inserted between the roof frame 111 and the side frame 112 in a state in which the second bent portion 221 is accommodated on an upper end portion of the side frame 112.

That is, the vehicle body frame 100 includes the roof frame 111 and the side frame 112, and the plurality of pillars is connected to and supported by the side frame 112. The vehicle body frame 100 may be configured so that the gap is formed between the roof frame 111 and the side frame 112.

Therefore, the second bent portion 221 of the second portion 220 is accommodated on the upper end portion of the side frame 112, and the end portion of the second bent portion 221 is inserted into the gap between the roof frame 111 and the side frame 112 so that the position of the second portion 220 may be fixed on the vehicle body frame 100.

That is, the second portion 220, which forms the external plate 200, needs to be kept positioned at the precise position when the second portion 220 is joined to the vehicle body frame 100 by applying the joining agent. Therefore, because the second bent portion 221 of the second portion 220 has a shape bent inwardly, a change in position of the second bent portion 221 in the gravitational direction is restricted when the second bent portion 221 is accommodated on the side frame 112 of the vehicle body frame 100. Because the second bent portion 221 is formed to be curved so that the end portion of the second bent portion 221 is inserted between the roof frame 111 and the side frame 112, the end portion of the second bent portion 221 may be inserted between the roof frame 111 and the side frame 112 so that the position of the second portion 220 may be fixed.

Furthermore, the structure in which the end portion of the second bent portion 221 is bent downward and inserted prevents deterioration in design of an external appearance.

Therefore, when the second portion 220 is joined to the vehicle body frame 100, the position of the second portion 220 is maintained while the joining agent is cured in the state in which the second portion 220 is positioned at the precise position on the vehicle body frame 100. Therefore, the cured joining agent may ensure robust bondability.

Meanwhile, the third portion 230 is formed so that a third bent portion 231 at a front end portion thereof is located between the first portion 210 and the vehicle body frame 100, a third bent portion 231 at an upper end portion thereof is located between the second portion 220 and the vehicle body frame 100, and a third bent portion 231 at a rear end portion thereof is matched with the rear end portion of the external periphery of the rear part 100b of the vehicle body frame 100.

As described above, the third portion 230 is provided at the rear side of the first portion 210 and disposed at the lower side of the second portion 220, the plurality of third bent portions 231 is formed along a rim portion of the third portion 230, and the third portion 230 is joined to the first portion 210, the second portion 220, and the vehicle body frame 100.

As illustrated in FIG. 8, a front end portion of the third bent portion 231 at the front end portion of the third portion 230 is curved inward and overlaps the first portion 210 so that an external surface of the third portion 230 and an external surface of the first portion 210 may be matched with each other in a forward and rearward direction thereof.

As described above, the first and third portions 210 and 230 may be disposed in the forward/rearward direction, and the third bent portion 231 at the front end portion of the third portion 230 may be curved toward the inside of the first portion 210 and overlap the first portion 210. In the instant case, the third bent portion 231 at the front end portion of the third portion 230 is joined to the first portion 210 and the vehicle body frame 100 by the joining agent so that the first portion 210 and the third portion 230 may be fixed to the vehicle body frame 100.

As described above, the joining portions of the first and third portions 210 and 230 overlap each other, and the third bent portion 231 at the front end portion of the third portion 230 extends forward and is inserted into the first portion 210, preventing water or foreign substances from being introduced between the joining portions of the first and third portions 210 and 230. That is, rainwater flows from the front side toward the rear side when the mobility vehicle travels. The structure, in which the first portion 210 covers the third bent portion 231 of the third portion 230 in the movement direction of the mobility vehicle, prevents the penetration of rainwater and performs sealing by the joining agent.

Meanwhile, as illustrated in FIG. 9, an upper end portion of the third bent portion 231 at the upper end portion of the third portion 230 is curved inward and overlaps the second portion 220 so that the external surface of the third portion 230 and an external surface of the second portion 220 may be matched with each other in the upward/downward direction thereof.

As described above, the second and third portions 220 and 230 may be disposed in the upward/downward direction, and the third bent portion 231 at the upper end portion of the third portion 230 may be curved toward the inside of the second portion 220 and overlap the second portion 220. In the instant case, the third bent portion 231 at the upper end portion of the third portion 230 is joined to the second portion 220 and the vehicle body frame 100 by the joining agent so that the second portion 220 and the third portion 230 may be fixed to the vehicle body frame 100.

As described above, the joining portions of the second and third portions 220 and 230 overlap each other, and the third bent portion 231 at the upper end portion of the third portion 230 extends upward and is inserted into the second portion 220, preventing water or foreign substances from being introduced between the joining portions of the second and third portions 220 and 230. For example, water flows from the upper side toward the lower side thereof. The structure, in which the second portion 220 covers the third bent portion 231 of the third portion 230, prevents the penetration of water and performs sealing by the joining agent.

The third portion 230, the second portion 220, and the first portion 210 of the external plate 200 according to an exemplary embodiment of the present disclosure may be sequentially joined to the vehicle body frame 100.

With the structures of the bent portions of the first portion 210, the second portion 220, and the third portion 230, the third portion 230 is joined to the vehicle body frame 100 first, and then the second portion 220 is joined to the upper side of the third portion 230 so that the second portion 220 is joined to the third bent portion 231 of the third portion 230 while overlapping the third bent portion 231, and the second bent portion 221 of the second portion 220 is accommodated on and joined to the vehicle body frame 100. Therefore, the first portion 210 is joined to the front end portion of the third portion 230 and the second portion 220 so that the second and third portions 220 and 230 are simultaneously joined to the first portion 210. Therefore, the watertightness function of each of the parts of the external plate 200 according to an exemplary embodiment of the present disclosure may be ensured by each of the bent portions, and the robust joined state may be maintained in the state in which each of the parts is positioned at the precise position.

Meanwhile, as illustrated in FIG. 10, a groove portion 120 may be provided in the vehicle body frame 100, an insertion portion 240, which is fitted with the groove portion 120, may be provided on an internal surface of the part of the external plate 200, and the insertion portion 240 is inserted into the groove portion 120 when the part is joined to the vehicle body frame 100 so that the fixed state may be maintained.

A plurality of groove portions 120 of the vehicle body frame 100 may be provided at the positions with which the first portion 210, the second portion 220, and the third portion 230 are matched. The groove portion 120 may be formed in a separate bracket provided to fasten the components of the vehicle body frame 100.

An insertion portion 240 may be formed in each of the parts of the external plate 200, and the insertion portion 240 may be fitted with the groove portion 120 so that each of the parts may be mounted on the vehicle body frame 100. The insertion portion 240 may be manufactured separately from the external plate 200 and joined to an internal surface of the part.

Therefore, each of the parts, which form the external plate 200, is joined to the vehicle body frame 100, and the insertion portion 240 of the part is fitted with the groove portion 120 of the vehicle body frame 100 so that the mounted state is maintained. Therefore, each of the parts may be kept in contact with the vehicle body frame 100 for the time for which the joining agent is cured. Furthermore, with the assembly as well as the structure in which the groove portion 120 and the insertion portion 240 are inserted, the external plate 200 may be kept robustly coupled to the vehicle body frame 100.

Meanwhile, fastening members B may penetrate the vehicle body frame 100 from inside to outside. The part of the external plate 200 may be fixed to the vehicle body frame 100 as the fastening members B are fastened when the part is joined to the vehicle body frame 100.

The fastening member B may be configured as a stud bolt. As the fastening member B is fastened to the part of the external plate 200 while penetrating the vehicle body frame 100 from inside to outside thereof, the external plate 200 may be fixed to the vehicle body frame 100 by the fastening member B.

A plurality of fastening members B may be provided at the positions on the vehicle body frame 100 with which the first portion 210, the second portion 220, and the third portion 230 are matched. The fastening member B may be fastened to a separate bracket provided to fasten the components of the vehicle body frame 100.

Therefore, each of the parts, which form the external plate 200, is kept mounted on the vehicle body frame 100 by the fastening member B so that each of the parts may be kept in contact with the vehicle body frame 100 for the time for which the joining agent is cured. Furthermore, when the external plate 200 is completely joined to the vehicle body frame 100 by the joining agent, the fastening member B may be removed to reduce costs and the weight of the mobility vehicle.

Meanwhile, as illustrated in FIG. 11, a plurality of protruding portions 130 having a predetermined pattern may be formed on a portion of the vehicle body frame 100 that faces the external plate 200, and the external plate 200 may be joined to the protruding portions 130 while being in contact with the protruding portions 130.

As described above, the plurality of protruding portions 130 is formed on the part of the vehicle body frame 100 that faces the external plate 200, and the joining agent is applied onto the protruding portions 130 so that the external plate 200 may be fixed to the vehicle body frame 100 by the joining agent in the state in which the external plate 200 is accommodated on the protruding portion 130.

The protruding portions 130 may be provided on a lateral surface of the vehicle body frame 100 while having a predetermined pattern. As the external plate 200 is accommodated on the protruding portions 130, the external plate 200 may be joined to the vehicle body frame 100 by the protruding portions 130 without being in surface-contact with the vehicle body frame 100.

According to the panel assembly for a mobility vehicle structured as described above, even though the specifications of the vehicle body frame 100 are changed, some of the plurality of parts, which forms the external plate 200, may be changed and applied to the changed vehicle body frame 100, which makes it possible to flexibly cope with the specifications of various mobility vehicles.

Furthermore, when the external plate 200 is joined to the vehicle body frame 100, the bent portion is accommodated on and joined to the vehicle body frame 100, and the fixed state is maintained by the fastening method or the fitting method when the external plate 200 is joined to the vehicle body frame 100 so that the robust fixed state is maintained.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A panel assembly for a mobility vehicle, the panel assembly comprising:
　a vehicle body frame; and
　an external plate including a plurality of parts,
　wherein each of the parts includes a bent portion that adjoins an external periphery of the vehicle body frame along the external periphery of the vehicle body frame, the parts are coupled to one another, and the bent portions of the parts are matched with the external periphery of the vehicle body frame so that the external plate is coupled to the vehicle body frame,
　wherein the external plate includes:
　　a first portion disposed on a front part of the vehicle body frame;
　　a second portion disposed at an upper side of a rear part of the vehicle body frame; and
　　a third portion disposed at a lower side of the rear part of the vehicle body frame, and
　wherein the third portion is formed so that a third bent portion at a front end portion thereof is located between the first portion and the vehicle body frame, a third bent portion at an upper end portion thereof is located between the second portion and the vehicle body frame, and a third bent portion at a rear end portion thereof is located at a rear end portion of an external periphery of the rear part of the vehicle body frame.

2. The panel assembly of claim 1, wherein each of the parts of the external plate is made of a stainless material.

3. The panel assembly of claim 1,
wherein the first portion is formed to be matched with an external peripheral shape of the front part of the vehicle body frame including a front pillar of the vehicle body frame, and
wherein a first bent portion is provided at an upper end portion of the first portion and matched with an upper end portion of the external periphery of the vehicle body frame and the front pillar of the vehicle body frame.

4. The panel assembly of claim 3, wherein the first bent portion includes:
a first parting portion matched with the front pillar; and
a second parting portion matched with an upper end portion of the external periphery of the vehicle body frame.

5. The panel assembly of claim 4, wherein the first portion is joined and fixed to the upper end portion of the external periphery of the vehicle body frame and the front pillar of the vehicle body frame in a state in which the first parting portion and the second parting portion are joined.

6. The panel assembly of claim 1,
wherein the second portion is formed to be matched with an external peripheral shape of the rear part of the vehicle body frame including a center pillar and a rear pillar of the vehicle body frame, and
wherein a second bent portion is provided at an upper end portion of the second portion and matched with an external peripheral shape of an upper end portion of the vehicle body frame.

7. The panel assembly of claim 6, wherein the second bent portion is bent to be matched with upper and rear end portions of the rear part of the vehicle body frame.

8. The panel assembly of claim 7,
wherein the second bent portion is formed by bending upper and rear end portions of the second portion inwardly, and
wherein an end portion of the second bent portion at the rear end portion is partially cut, and a remaining end portion of the second bent portion at the upper end portion is bent inward in a state in which the end portion of the second bent portion at the upper end portion is bent in a same direction as the end portion of the second bent portion at the rear end portion so that the end portions of the second bent portion at the upper and rear end portions are bent to overlap each other.

9. The panel assembly of claim 6,
wherein a gap is formed between a roof frame and a side frame of the vehicle body frame, and
wherein the second bent portion is formed to be curved so that an end portion of the second bent portion is inserted between the roof frame and the side frame in a state in which the second bent portion is accommodated on an upper end portion of the side frame.

10. The panel assembly of claim 1, wherein the front end portion of the third bent portion at a front end portion of the third portion is curved inward and overlaps the first portion so that an external surface of the third portion and an external surface of the first portion are matched in a forward and rearward direction thereof.

11. The panel assembly of claim 1, wherein an upper end portion of the third bent portion is curved inward and overlaps the second portion so that an external surface of the third portion and an external surface of the second portion are matched in an upward and downward direction thereof.

12. The panel assembly of claim 1, wherein the third portion, the second portion, and the first portion of the external plate are sequentially joined to the vehicle body frame.

13. The panel assembly of claim 1, wherein a groove portion is provided in the vehicle body frame, an insertion portion, which is fitted with the groove portion, is provided on an internal surface of the external plate, and the insertion portion is inserted into the groove portion when the parts are joined to the vehicle body frame so that a fixed state is maintained.

14. The panel assembly of claim 1,
wherein a fastening member is provided to penetrate the vehicle body frame from inside to outside thereof, and
wherein the parts of the external plate are fixed to the vehicle body frame as the fastening member is fastened when the parts are joined to the vehicle body frame.

15. The panel assembly of claim 1, wherein a plurality of protruding portions including a predetermined pattern is formed on a portion of the vehicle body frame that faces the external plate, and the external plate is joined to the protruding portions while being in contact with the protruding portions.

* * * * *